(12) United States Patent
Rooy et al.

(10) Patent No.: US 7,391,440 B2
(45) Date of Patent: Jun. 24, 2008

(54) PRODUCTION SYSTEM, CONTROL AREA FOR A PRODUCTION SYSTEM AND IMAGE CAPTURING SYSTEM FOR A PRODUCTION SYSTEM

(75) Inventors: Jan Van Rooy, s-Hertogenbosch (NL); Nicolaas Johannes Damstra, Breda (NL); Mike Stekelenburg, Vught (NL)

(73) Assignee: Thomson Licensing, Boulogne Billancourt (FR)

( * ) Notice: Subject to any disclaimer, the term of this patent is extended or adjusted under 35 U.S.C. 154(b) by 683 days.

(21) Appl. No.: 10/341,932

(22) Filed: Jan. 14, 2003

(65) Prior Publication Data

US 2003/0164883 A1    Sep. 4, 2003

(30) Foreign Application Priority Data

Jan. 16, 2002    (EP) .................................. 02290116

(51) Int. Cl.
*H04N 5/232* (2006.01)
*H04N 5/235* (2006.01)
*H04N 5/222* (2006.01)

(52) U.S. Cl. .................... 348/211.4; 348/229.1; 348/722
(58) Field of Classification Search ............. 348/211.4, 348/229.1, 722
See application file for complete search history.

(56) References Cited

U.S. PATENT DOCUMENTS

| | | | | |
|---|---|---|---|---|
| 5,111,288 A | * | 5/1992 | Blackshear | 348/143 |
| 5,838,368 A | * | 11/1998 | Masunaga et al. | 348/211.9 |
| 5,877,801 A | * | 3/1999 | Martin et al. | 348/36 |
| 6,269,217 B1 | | 7/2001 | Rodriguez | 386/46 |
| 6,356,303 B1 | | 3/2002 | Shibata et al. | 348/211 |
| 6,675,386 B1 | * | 1/2004 | Hendricks et al. | 725/105 |
| 6,961,082 B2 | * | 11/2005 | Miura et al. | 348/211.9 |
| 2001/0017656 A1 | | 8/2001 | Araki et al. | |
| 2002/0080247 A1 | * | 6/2002 | Takahashi et al. | 348/229 |
| 2003/0085997 A1 | * | 5/2003 | Takagi et al. | 348/143 |

FOREIGN PATENT DOCUMENTS

| | | |
|---|---|---|
| EP | 944260 | 9/1999 |
| JP | 2-280470 | 11/1990 |
| JP | 5-48950 | 1/1993 |
| JP | 10-282398 | 10/1998 |
| WO | 00/69168 | 11/2000 |

OTHER PUBLICATIONS

Patent Abstracts of Japan, vol. 1999, No. 01, Jan. 29, 1999 & JP 10-282398 and US 6356303.
Patent Abstracts of Japan, vol. 015, No. 050, Feb. 6, 1991 & JP 2-280470.
Patent Abstracts of Japan, vol. 017, No. 351, Jul. 2, 1993 & JP 5-048950.

\* cited by examiner

*Primary Examiner*—Lin Ye
*Assistant Examiner*—Durnford-Geszvain Dillon
(74) *Attorney, Agent, or Firm*—Joseph J. Laks; Robert B. Levy; J. Tony Villabon

(57) ABSTRACT

An advantageous production system comprises at least a camera producing a raw digital signal and a processing circuit for generating a processed video signal from the raw digital signal. In a control area, at least a camera control interface is able to set at least a parameter in the processing circuit. The processing circuit is located in the control area. An image capturing system for such a production system is also presented.

19 Claims, 7 Drawing Sheets

PRIOR ART

PRODUCTION SYSTEM, CONTROL AREA FOR A PRODUCTION SYSTEM AND IMAGE CAPTURING SYSTEM FOR A PRODUCTION SYSTEM

This application claims the benefit of European Patent No. 02290116.9, filed Jan. 16, 2001.

FIELD OF THE INVENTION

The invention relates to a production system, to a control area for a production system and to an image capturing system for a production system.

BACKGROUND OF THE INVENTION

In traditional multi-camera production systems, the cameras, base stations and video mixer plus digital effects are closely linked together in a system with an overall low latency.

A simplified example of such a production system is given in FIG. 1.

At the camera location 2, a person with a camera 4 (camera person) frames the picture and keeps it in focus. The camera person works with the camera 4 on the basis of a picture observed in the camera viewfinder (not shown). He generally gets his commands from the director.

In the control area 6 (generally a control room), a camera control operator uses camera controls 8 to control parameters of the camera 4 and its video processing circuits 12, like iris, black, painting and contours, in order to define the "looks" of the picture and to maintain proper video levels and white balance. The camera control operator works on the basis of a picture on a reference monitor 10 at the control location (control room 6).

As the camera location 2 and control area 6 are conventionally close to each other and simply connected by electrical wires 16, 18 (e.g. triax cables), there is no noticeable latency in the communication channel consisting of these wires 16, 18 between the camera 4 and its processing circuits 12 on the one hand, and the control area 6 with camera controls 8 on the other hand. Although the processing circuits 12 are represented on FIG. 1 separate from the camera 4 for the sake of clarity, they are most generally part of the camera 4.

When the camera control operator modifies a parameter on camera controls 8, the information is transmitted via the control electrical wire 18 to the processing circuits 12 of the camera 4. There, the change in value of the parameter becomes effective, thus altering the effects of the processing circuits 12 on the raw (video and audio) signal 20. The change is then visible on the processed signal 22, which is transmitted to the control area 6 via the signal electrical wire 16. At this time, the change is visible on the monitor 10.

This closed control loop needs very low latency (less than 0.1 second) to avoid instability and permit fast control. This is easy to obtain with the conventional structure as described above where the camera location 2 and the control area 6 are close to each other, or connected with a low-latency connection.

The processed signal 22 is ready to be broadcast or transmitted as schematically represented in FIG. 1, for instance via an emitter 14.

The production chain may involve additional steps: for instance, a production control operator may switch between pictures of several cameras and add effects if necessary, on the basis of commands he gets from the director.

In recent years, a lot of new communication channels have been developed, as for instance satellite links and public networks like the Internet, which allow the transmission of information from a wide range of locations on Earth.

It would be very convenient if these new communications channels could be used to transmit video and audio information from the camera to the control area of the broadcaster as it would greatly widen the possibilities for the camera and the camera person to move freely. Furthermore, it could reduce production cost as only part of the production team will have to travel to and stay on the location of the shooting.

The problem with such long distance communication channels is that they suffer noticeable latency which make them totally maladapted to be used as a communication channel between camera and control area. Effectively, if such a communication channel were used in the conventional system described above, the time constant of the closed control loop would be too large to avoid instability and to allow fast control.

This problem is even more important as it is generally desirable to compress the video and audio information transmitted via such communication channels, which further lengthen the latency time of the communication.

The solution of avoiding long distance in the closed control loop by placing the camera controls at the camera location is not totally satisfactory in professional production, as the director wants to entirely monitor the looks or appearance of the picture at the control room (central studio).

SUMMARY OF THE INVENTION

The invention provides an advantageous solution for a production system, notably a television production chain, with at least a camera and corresponding camera controls, wherein the camera and corresponding controls can be linked via any communication channel, including communication channels with latency.

The advantageous production system comprises at least a camera producing a raw digital signal, a processing circuit for generating a processed video signal from the raw digital signal and a control area with at least a camera control interface for setting at least a parameter in the processing circuit, and the processing circuit is located in the control area.

In a first arrangement;
- the camera and the control area are linked via a communication channel with noticeable latency;
- the communication channel is liable to a delay of 100 ms or more:
- the camera has an iris and means for transmitting information indicative of the iris aperture as metadata to the raw digital signal.

The invention also provides a control area for a production system comprising means for receiving a raw digital signal generated by a camera, a processing circuit for generating a processed video signal from the raw digital signal, and a camera control interface for setting at least a parameter in the processing circuit.

In a further arrangement;
- the control area has means for receiving information indicative of the aperture of an iris of the camera as metadata to the raw digital signal;
- the camera control interface comprises camera controls generating at least a luminance information and means for setting a gain parameter in the processing circuit based on the luminance information and on the information indicative of the aperture of the iris of the camera;

the control area has means for receiving a processing signal generated by a further camera.

An image capturing system for a production system is also proposed. It comprises a camera producing a raw digital signal and means for sending the raw digital signal on a communication channel.

The invention as provides a production system comprising at least a camera producing a raw signal, a processing circuit for generating a processed video signal from the raw signal and camera controls for controlling parameters in the processing circuit, wherein the camera and the processing circuit are linked via a remote communication channel.

BRIEF DESCRIPTION OF THE DRAWINGS

Further features of the invention will appear in the following description of exemplary embodiments made with reference to the attached drawings where.

DETAILED DESCRIPTION OF PREFERED EMBODIMENTS

Figure 2:
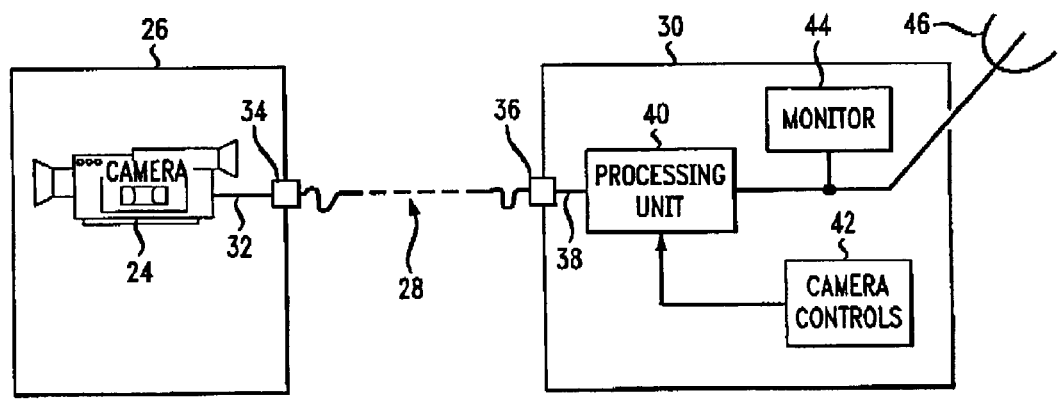
FIG. 2 illustrates a production system according to a first embodiment of the invention.

In the television production system schematically represented in FIG. 2, a camera 24 generates raw audio and video signals which are coupled to an output cable 32. The camera location 26 is remote from the control area (or control location), i.e. the control room 30 in the central studio and its surroundings. The control room 30 and the camera location 26 are linked via a remote connection 28, for instance via the Internet.

At the camera location 26, a first communication interface 34 can transfer signals of the output cable 32 to the Internet. Symmetrically, in the control room 30, a second communication interface 36 retrieves the signals on the Internet to put them on an input cable 38.

In the control area 30 a processing circuit 40 receives the raw signals from the camera 24, transmitted via the output cable 32, the remote connection 28 and the input cable 36. The processing unit 40 generates, based on these raw signals, video and audio signals in conventional formats, for instance AES/EBU audio and ITU R-BT656 video.

The parameters of the processing circuit 40, i.e. the parameters of the conversion from raw signals to processed signals, are controllable by camera controls 42 (also situated in the control room 30). The video sequence represented by the (processed) video signal is displayed on a monitor 44 of the control room 30 to be monitored by the camera control operator and viewed by the director. The camera control operator can change the look of the video sequence by changing the parameters of the processing circuit 40 via the camera controls 42.

As the control loop is entirely situated in the control area (i.e. in or near the the control room 30), it involves no noticeable latency and operates correctly. This even though the camera 24 and control area 30 are linked via a communication channel with latency like the Internet. In this context, a delay of 100 ms or more is considered as noticeable latency in the communication channel.

Figure 3:
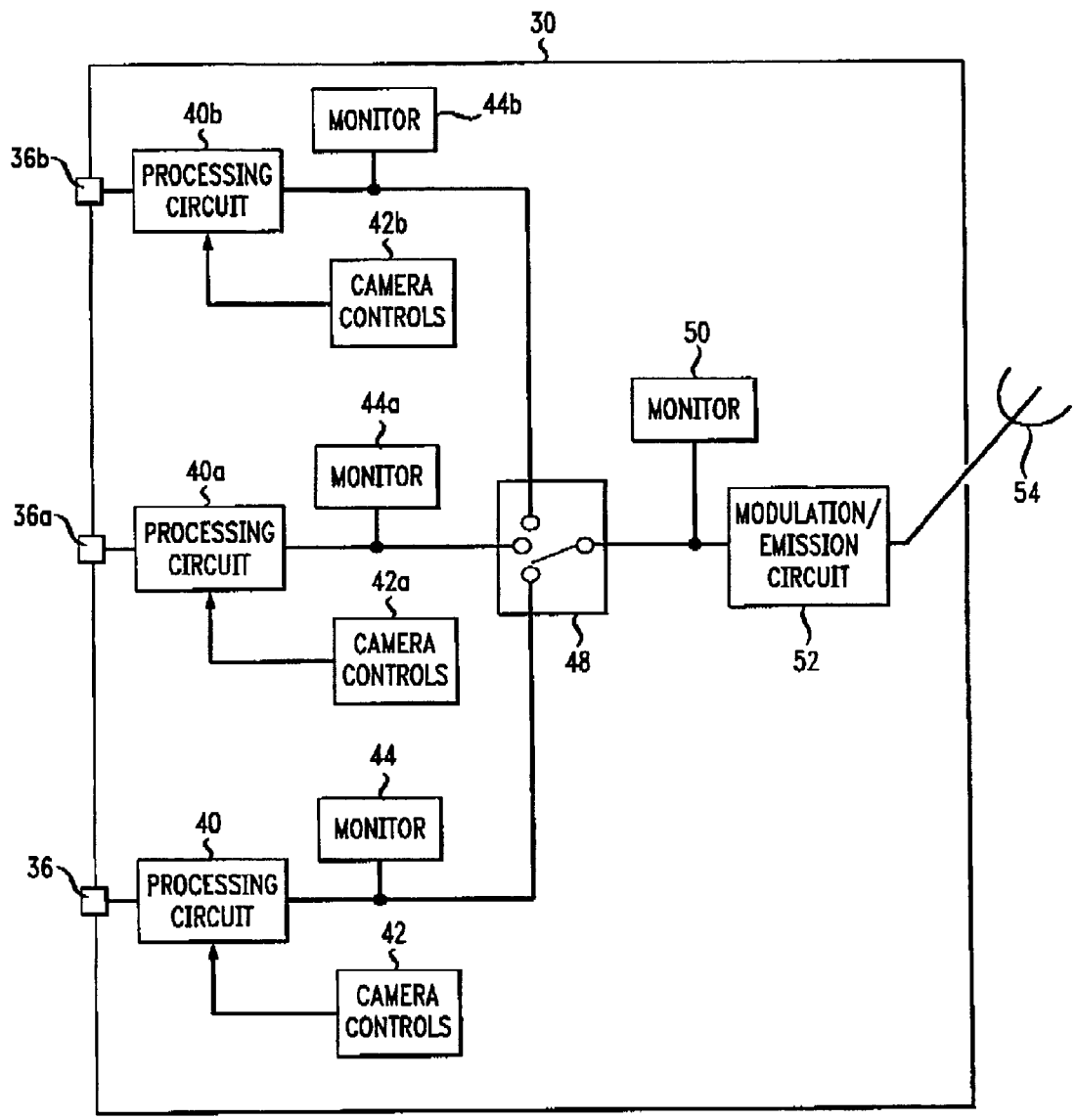
FIG. 3 illustrates with more detail a control room according to the first embodiment.

As shown in FIG. 3, the control room 30 of FIG. 2 is provided with several communication interfaces 36, 36a, 36b so as to receive via the Internet or other communication channels raw signals from several cameras. The raw signal from each camera is then processed via a dedicated processing circuit 40, 40a, 40b which parameters are controlled by a corresponding camera control operator via the respective camera controls 42, 42a, 42b. The camera control operator can follow his action on the processing on the corresponding monitor 44, 44a, 44b as explained above.

The (processed) video signals generated by each processing circuit 40, 40a, 40b are forwarded to a mixer schematically represented at 48 under the control of a production control operator. The resulting video sequence is displayed on a monitor 50 watched by the production control operator and the director. This video sequence is also converted by a modulation-and-emission circuit 52 into a signal to be transmitted by, for example a satellite antenna 54. Though FIG. 3 shows only camera connections 36, 36a, 36b meant to receive a raw signal, the conventional solution as shown in FIG. 1 can of course be used for other cameras which would also be connected to the mixer 48.

Figure 4:
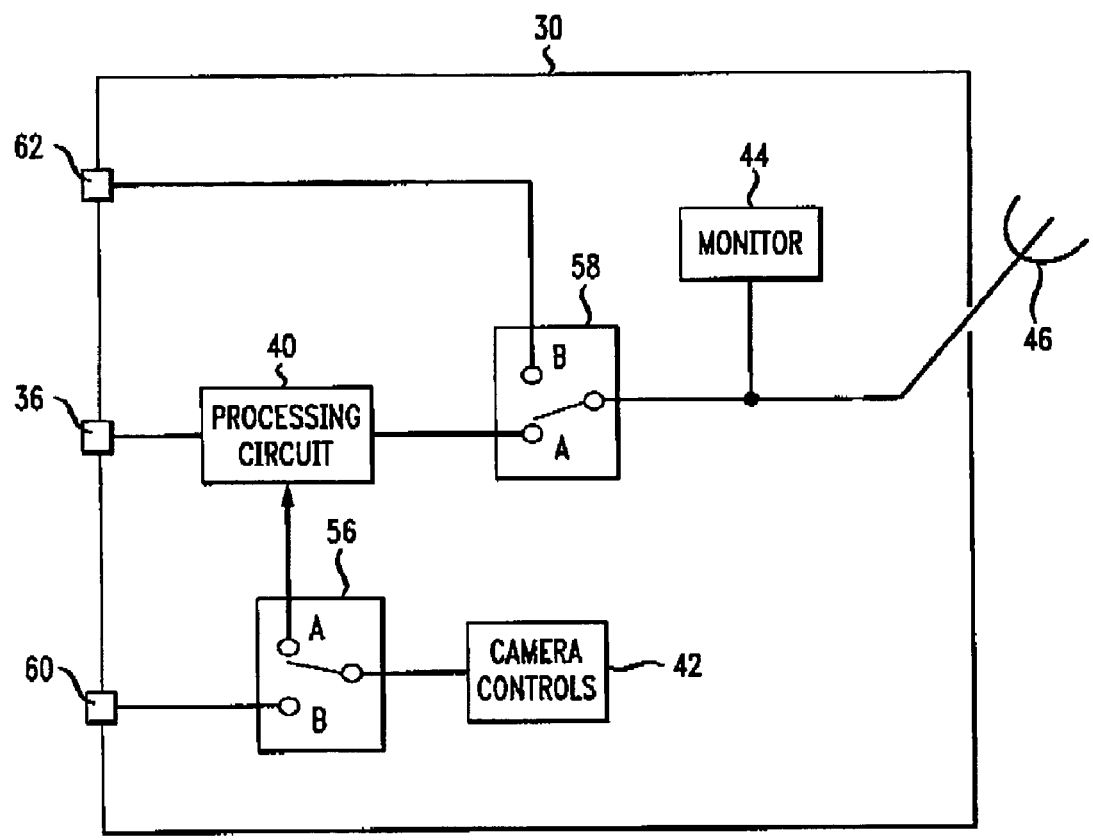
FIG. 4 illustrates a possible solution for camera connection to the control room.

A possible solution for camera connection to the control room 30 is represented in FIG. 4. A control switch 56 allows to selectively connect the camera controls 42 to the processing circuit 40 to operate as explained in relation to FIG. 2 (position A) or to a connector 60 where a wire similar to the wire 18 of FIG. 1 can be plugged (position B).

Figure 1:
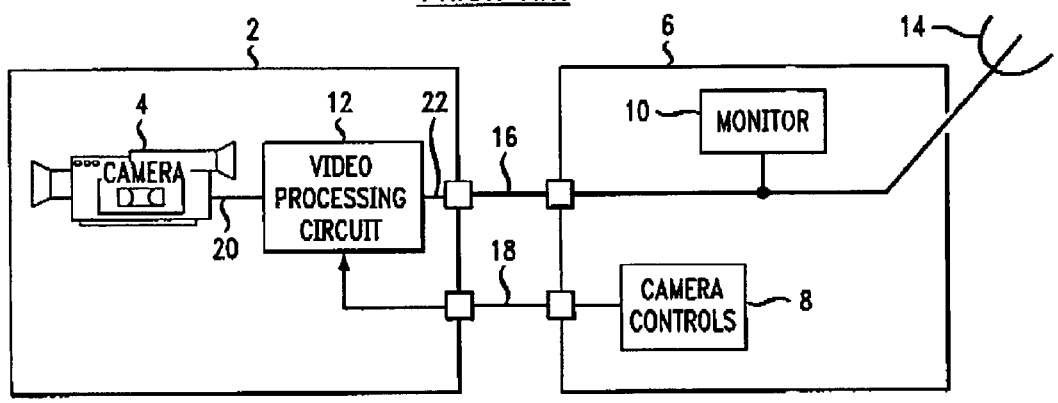
FIG. 1 illustrates a conventional production system as already explained.

A signal switch 58 allows to selectively connect the output of the processing circuit 40 (position A) or a connector 62 receiving a (processed) video signal as on wire 16 in FIG. 1 (position B) to the mixer and emission part (schematically represented at 46 on FIG. 4). The video sequence represented by the output of the signal switch is displayed on the monitor 44.

This solution allows two possible ways to use the camera channel represented in FIG. 4: as taught by the invention (as explained in relation to FIG. 2) when both the signal switch 58 and the control switch 56 are set to position A and alternatively in the conventional way described at FIG. 1 when both switches are set to position B.

FIG. 4 represents the channel associated with one camera but several such channels can be used in the control room 30.

Figure 5:
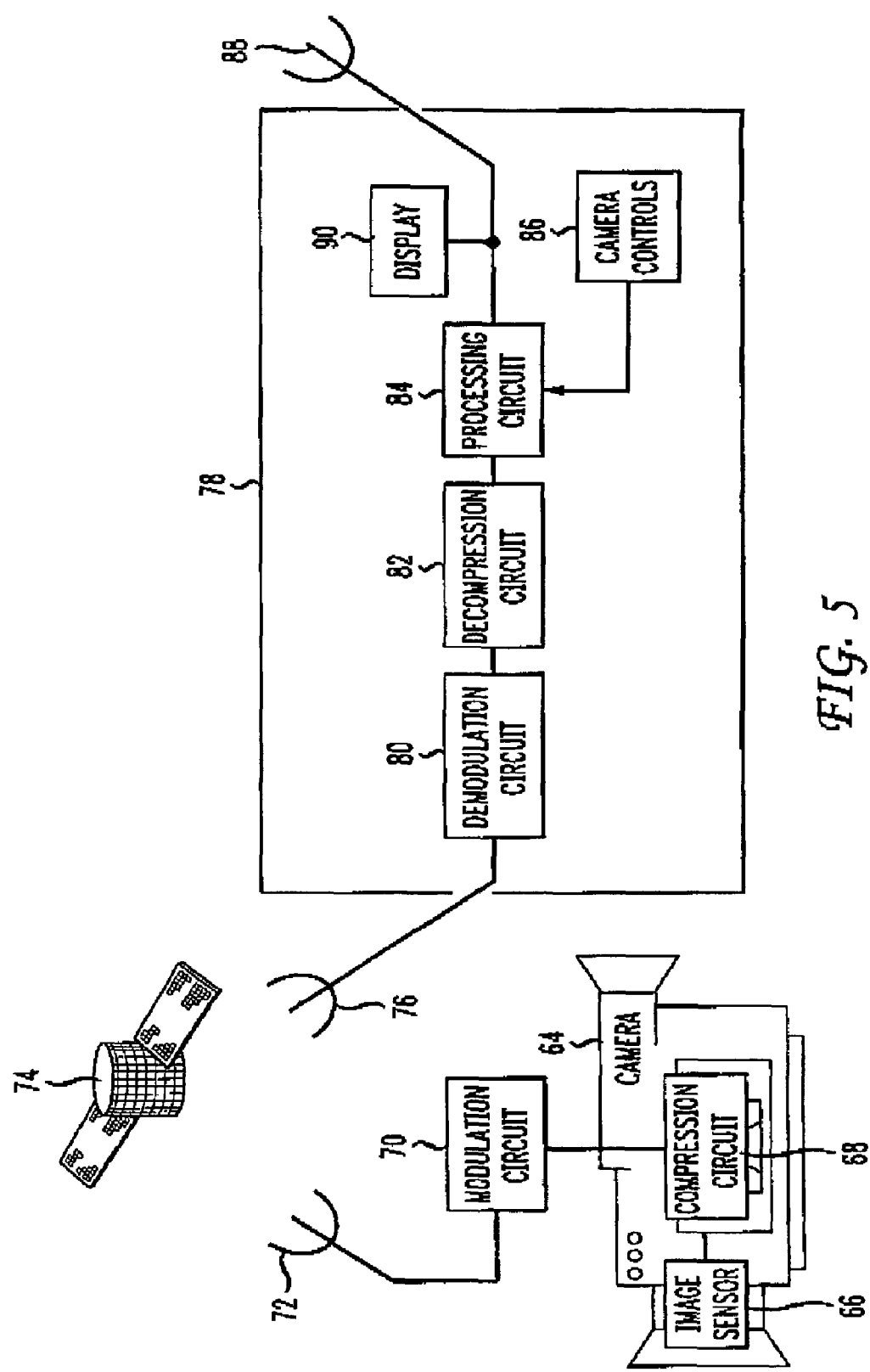
FIG. 5 illustrates a second embodiment of the invention.

A second embodiment of the invention is represented in FIG. 5.

A camera 64 has an image sensor 66, for instance a charge coupled device (CCD) associated with an optical system, which generates an analogue sensor signal, i.e. an representation of the pictorial reality facing the camera 64, which is immediately digitised by an analogue-to-digital converter (not represented). A logarithmic conversion may also be applied.

The digitised sensor signal is compressed by a compression circuit 68, for instance by MPEG or motion JPEG2000. The compressed signal is then modulated by a modulation circuit 70 and emitted on a satellite antenna 72.

The analogue sensor signal, the digitized sensor signal and the compressed signal are raw, unprocessed, signals (or essence) as the look of the video sequence (represented by a video signal) which will be generated based on these raw signals is not completely defined at this stage.

The compressed raw signal is sent to the control area 78 via a satellite communication 74. Although the satellite communication is here simply represented by a satellite facing two satellite antennas, it should be understood that an actual satellite communication is much more complex. For instance, it may not only involve the satellite itself but also ground-based networks. As a consequence, the satellite communication generally implies latency.

The compressed raw signal is received by the control area 78 on a satellite antenna 76, and the digitised sensor signal can therefore be retrieved by a demodulation circuit 80 and decompression circuit 82.

The retrieved digitised sensor signal is then used as raw signal in accordance with the teachings of the first embodiment; the retrieved digitised sensor signal is processed by a processing circuit 84 with parameters set by the camera controls 86, and the processed video signal is viewed by the camera control operator on a display 90. The processed video signal is also transmitted to the emitting part 88 of the control area 78, via mixers as explained in relation with FIG. 3.

In the embodiments described above, the iris of the camera is fixed at least during the broadcasting time when the camera is used. (Due to possible latency in the communication channel, it would not be possible to predict when the image change due to the iris adjustment gets to the control area.) The luminosity adjustment is thus entirely realised by modifying the gain in the processing circuit.

The two further embodiments are solutions where the iris of the camera can be adjusted even during the broadcasting time when the camera is used.

Figure 6:
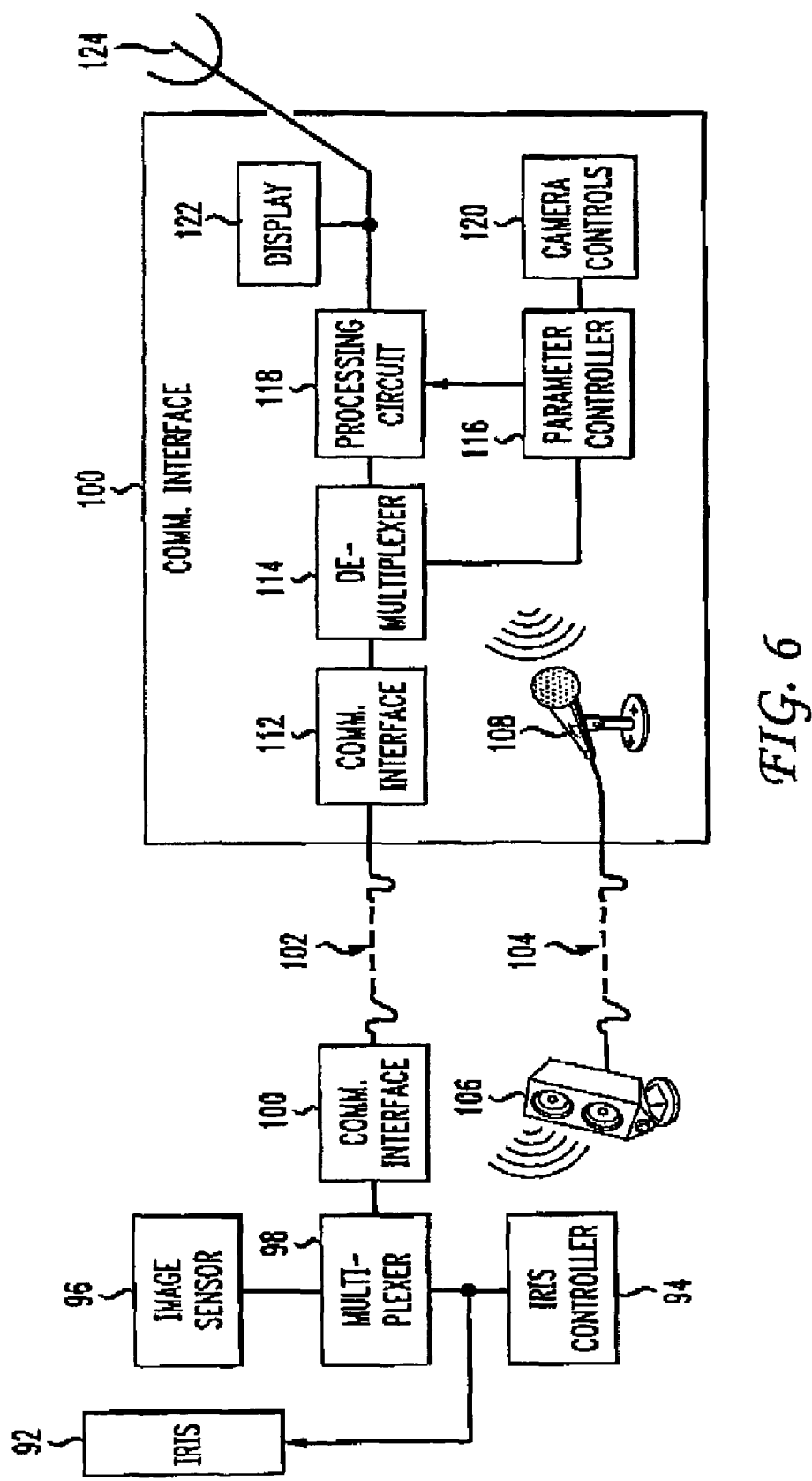
FIG. 6 illustrates a third embodiment of the invention.

The third embodiment of the invention is represented in FIG. 6.

An iris 92 of a camera is adjusted according to the camera person action on an iris controller 94. The control value output from the iris controller 94 to the iris 92 is also passed to a multiplexer 98, for instance as a digital control value.

An image sensor 96 generates a raw digital stream. The image sensor includes an optical system associated with the iris 92, a CCD and an analogue-to-digital converter. The raw digital stream generated by the image sensor 96 is consequently dependent upon the adjustment of the iris 92 concerning its inherent luminosity.

The raw digital stream from the image sensor 96 is received by the multiplexer 98. The multiplexer 98 outputs a combined digital stream comprising the raw digital stream as main data and the digital control value (representing it is adjustment) as metadata. The combined digital stream is then sent to the control room 110 via a communication network 102, for example the Internet, through a first communication interface 100.

The control room 110 in the control area receives the combined digital stream from the Internet on a second communication interface 112, and forwards it to a demultiplexer 114, where the raw digital stream (main data of the combined digital stream) and the digital control value (metadata) are separated and sent to respective processing circuit 118 and parameter controller 116.

The parameter controller 116 sets the parameters of the processing circuit 118 based on the digital control value and on camera controls 120 adjusted by the camera control operator. All parameters except for the gain are determined by the value output of the camera controls 120. The gain of the processing circuit 118 is determined in the parameter controller 116 from the digital control value representing the iris adjustment and a luminance value received from the camera controls 120 and indicating the desired luminance of the processed video picture as explained below.

The camera person at the camera location and the control room 110 are also linked via an audio communication channel 104 whereby a microphone 108 in the control room 110 allows to transmit instructions from the control operator or the director to headphones 106 of the camera person. The audio communication channel 104 can physically be the same as the communication network 102 (here the Internet), or a different channel (here for instance a cellular phone communication).

Based on instructions received from the control room 110, the camera person can modify the iris adjustment through the iris controller 94. For instance, the control operator can ask the camera person to widen the iris aperture because he feels the whole dynamic range of the raw digital stream is not properly used.

Due to possible latency in the audio communication channel 106 and in the communication network 102, the raw digital stream taken by the camera with widened iris can take seconds to get to the control room. However, the information about when this raw digital stream with widened iris gets to the control room is contained in the metadata of the combined digital stream.

Supposing the desired luminance is not changed by the control operator at the camera controls 120, when the digital control value in the metadata indicates that the received raw digital stream was taken with widened iris, the parameter controller 116 automatically lowers the gain of the processing circuit 118, for instance according to a look-up table, so that the combined effect of iris widening and gain reduction results in a constant luminance of the processed video signal.

Figure 7:
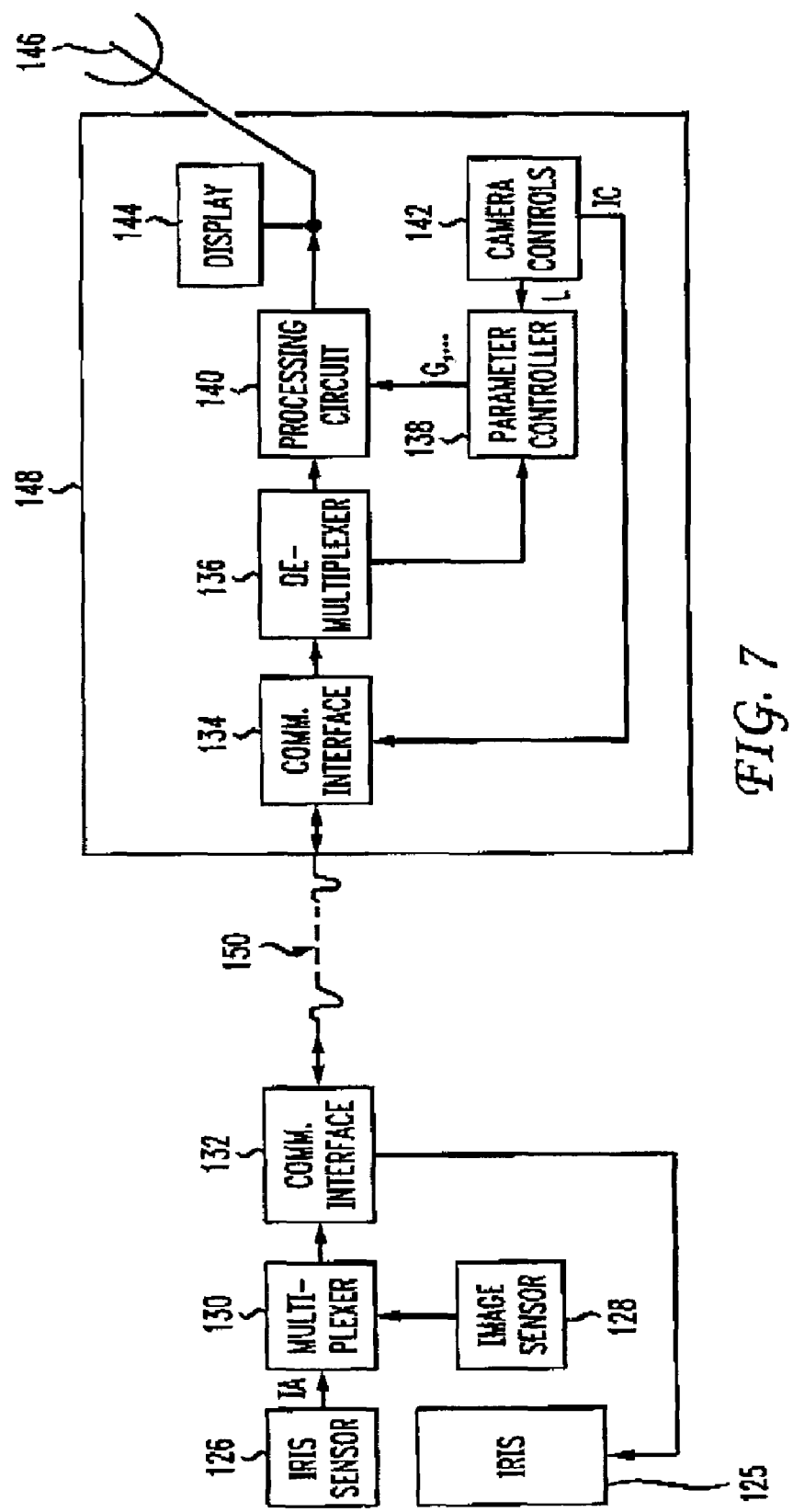
FIG. 7 illustrates a fourth embodiment of the invention.

As explained in the previous embodiments, the video signal is monitored by the control operator on a display 122 and sent to an emitting part 124 to be broadcast. A fourth embodiment of the invention is represented in FIG. 7.

An image sensor 128 associated with an iris 124 generates a raw digital stream. An iris sensor 126 outputs information indicative of the iris aperture, preferably digitally coded, thereafter called the digital aperture information IA. The raw digital stream, and the digital aperture information IA are mixed by a multiplexer 130 in a combined digital stream. The raw digital stream is the main data of the combined digital stream whereas the digital aperture information is attached as metadata.

The combined digital stream from the multiplexer 130 is forwarded to a first communication interface 132 (situated at the camera location) which is meant to exchange data with a second communication interface 134 situated in a control room 148. The data to be exchanged are notably the combined digital stream from the first communication interface 132 to the second communication interface 134 and an iris control parameter from the second communication interface 134 to the first communication interface 132. The first communication interface 132 and the second communication interface 134 are linked via a bidirectional channel 150, preferably a remote communication channel, as for instance the Internet.

The iris control parameter received from the control room 148 (as explained with more detail below) is transmitted to the iris mechanism, which adjusts the iris accordingly.

In the control room 148, the combined raw digital stream received by the second communication interface 134 is transmitted to a demultiplexer 135 in order to separate the raw digital stream and the digital aperture information. The raw digital stream is forwarded to a processing circuit 140 where it is converted into a video signal. The digital aperture information is transmitted to a parameter controller 138, which sets the parameters of the processing circuit 140

The parameter controller 138 also receives information from camera controls 142, notably a desired luminance information L. The parameter values instructed by the parameter controller 138 are determined directly by the information received from the camera controls 142, except for the gain G of the processing circuit 140. The gain G is computed depending on the digital aperture information (indicative of the iris adjustment when the currently-processed raw digital stream was captured by the image sensor 128) and on the desired luminance information L.

The camera controls 142 also generates an information indicative of the desired iris adjustment IC, mentioned above as the iris control parameter and transmitted via the second communication interface 134 and the bi-directional channel 150 and the first communication interface 132 to the iris mechanism as explained above.

As explained in the previous embodiments, the video signal is monitored by the control operator on a display 144 and sent to an emitting part 146 to be broadcast.

According to a preferred implementation, the desired luminance information L and the iris control parameter IC can be modified simultaneously by action of the control operator on a single control. When the control operator wants to reduce the overall luminance of the picture he monitors on the display 144, he acts on this single luminance control.

Figure 8A:
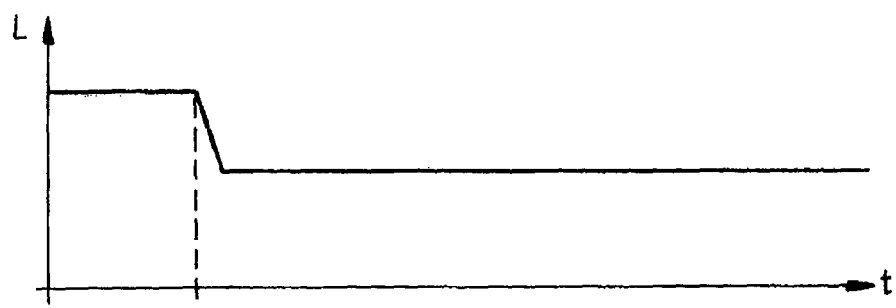
FIGS. 8a to 8d show the temporal variation of the desired luminance, the gain, the iris control and the iris aperture according to a possible implementation of the fourth embodiment.
Figure 8B:
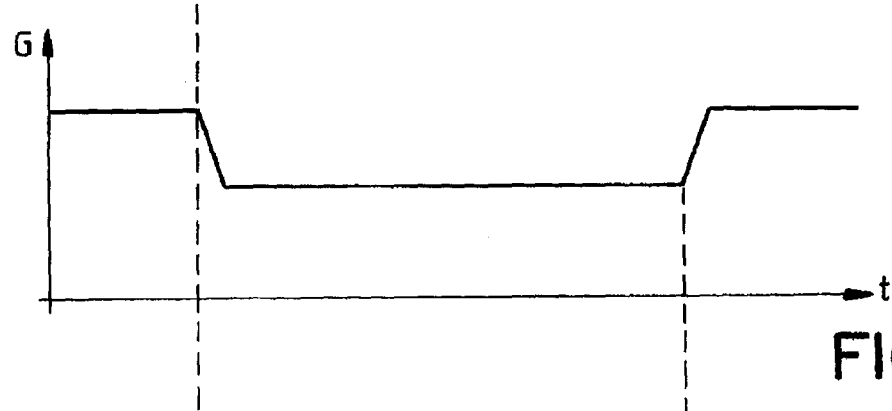
Figure 8C:
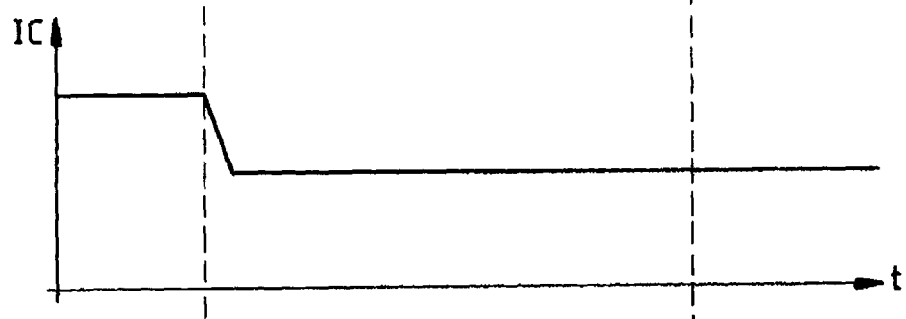

Immediately ($T_0$), both the desired luminance information L and the iris control parameter IC are outputted by the camera controls 142 with a reduced value, as depicted on FIGS. 8a and 8c. As it takes time for the change in iris control to be effective, the digital aperture information is at first unchanged, and the parameter controller 138 reduces the gain G of the processing circuit 140 to realise the reduction in luminance of the (processed) video signal, as wished by the control operator. The gain reduction is quasi-immediate as it does not involve a communication channel with latency (see FIG. 8b).

Figure 8D:
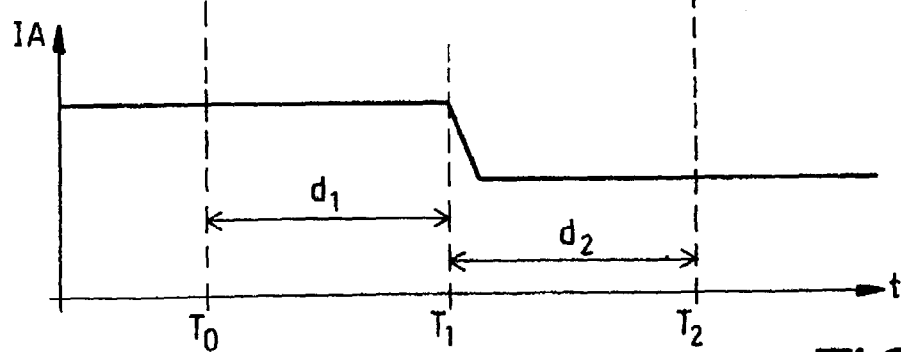

The iris control parameter IC is transmitted to the camera via the bidirectional channel 150, here the Internet, with noticeable latency. The iris aperture is thus adjusted with a delay d1 from the time $T_0$ when the control operator acted on the luminance control. When the iris aperture is adjusted (moment $T_1$), the actual adjustment is measured by the iris sensor 126 as digital aperture information IA (FIG. 8d) and sent to the control room 148 as metadata attached to the raw digital stream.

The transfer of the digital aperture information from the camera location to the control room 148 also needs a period of time d2 (notably due to latency in the communication channel) and gets to the control room 148 at T2 (T2=T1+d2). However, as already mentioned, the new digital aperture information gets to the control room at the same time as the raw digital stream captured with the corresponding iris aperture.

When the new digital aperture information gets to the control room 148, it is received by the parameter controller 138, which automatically increases the gain of the processing circuit 140 (as depicted on figure 8b). Thus the combined effects of closing the iris for the currently-processed stream and of increasing the gain of the processing circuit 140 results in a substantially constant overall luminance level of the processed video signal around moment $T_2$.

Though it was always referred to an emitting part in the control room in the above description, it should be understood that the invention also applies when a recording unit is used instead of the emitting part, i.e. when the production is recorded live but not transmitted live.

What is claimed is:

1. A production system comprising:
   at least a camera producing a raw digital signal;
   a processing circuit for generating a processed video signal from the raw digital signal;
   a control area with at least a camera control interface for setting at least a parameter in both the camera and in the processing circuit;
   wherein the camera and the control area are linked via a communication channel with noticeable latency;
   wherein the processing circuit is located in the control area;
   wherein the processing circuit is adapted to perform an operation corresponding to a parameter change in the camera; and
   wherein the processing circuit performs the operation corresponding to a parameter change in the camera until images captured by the camera under the changed parameter are available at the control area.

2. Production system according to claim 1, wherein the communication channel is liable to a delay of 100 ms or more.

3. Production system according to claim 1, wherein a requested change in a parameter of the camera causes a corresponding operation in the processing circuit until raw video signal for which the change in the parameter of the camera has been effected is received in the control area.

4. Production system according to claim 3, wherein, in a transition period, the combined effects of performing a requested change in a parameter of the camera in the processing circuit and changing the parameter in the camera produce a perceived constant effect.

5. Production system according to claim 1, wherein the camera has an iris and means for transmitting information indicative of the iris aperture as metadata to the raw digital signal.

6. Production system according to claim 1, wherein the corresponding operations in the processing circuit and the camera are defined in a look-up table.

7. Method according to claim 1, wherein, in a transition period, the combined effects of performing a requested change in a parameter of the camera in the processing circuit and changing the parameter in the camera produce a perceived constant effect.

8. A Control area for a production system comprising:
   means for receiving a raw digital signal generated by a camera located remote from the control area, the camera and the control area being coupled by a communication channel that is subject to latency;
   a processing circuit for generating a processed video signal from the raw digital signal;
   a camera control interface for setting at least a parameter in both the camera and in the processing circuit in parallel and controlling the processing circuit to perform an operation corresponding to setting the parameter in the camera, wherein data related to said parameter is added to a video representative signal formed by said camera, and wherein the processing circuit receives the video signal and the data from the camera;
   wherein the processing circuit performs the operation corresponding to a parameter change in the camera until images captured by the camera under the changed parameters are available at the control area.

9. Control area according to claim 8, with means for receiving information indicative of the aperture of an iris of the camera as metadata to the raw digital signal.

10. Control area according to claim 9, wherein the camera control interface comprises Camera controls generating at least a luminance information and means for setting a gain parameter in the processing circuit based on the luminance information and on the information indicative of the aperture of the iris of the camera.

11. Control area according to claim 8, with means for receiving a processed signal generated by a further camera.

12. The Production system of claim 1, wherein the camera and the processing circuit are linked via a remote communication channel.

13. A method for camera system control, comprising:
 a camera control providing control information for controlling a video parameter to both a remote camera head and a video processing circuit in a local base station in parallel, wherein the remote camera head and the video processing circuit are interconnected and subject to significant latency;
 smoothly changing said control of said video parameter;
 embedding data related to said video parameter in a video representative signal from said camera head; and
 varying said video parameter in both said camera head and said interconnected video processing circuit in said local base station in accordance with said data embedded in said video representative signal to generate an output video signal concurrently and in accordance with said smooth change.

14. The method of claim 13, wherein said varying step includes adaptively controlling said video parameter in said video processing circuit in said local base station to obviate control latency of said camera head in said output video signal.

15. The method of claim 13, wherein said controlling step comprises communicating bi-directionally between said interconnected camera head and said video processing circuit in said local base station.

16. The method of claim 13, wherein said controlling step comprises communicating hi-directionally between said camera head and said video processing circuit in said local base station with said bi-directional communications having different latency.

17. Method according to claim 13, wherein, in a transition period, the combined effects of performing a requested change in a parameter of the camera in the processing circuit and changing the parameter in the camera produce a perceived constant effect.

18. A method for camera control, comprising:
 forming a video parameter control signal at a first location, the video parameter control signal corresponding to a video parametor that is modified with respect to a video parameter currently applied in a camera at a second location;
 applying said video parameter control signal to a video processing circuit at said first location and in parallel thereto;
 coupling and applying said video parameter control signal to the camera at the second location wherein said coupling is subject to latency; and
 adding, using the camera, data related to said video parameter to a video representative signal formed by said camera;
 receiving, using the video processing circuit, the video signal and the data from the camera;
 controlling, using the video parameter control signal, in the processing circuit at the first location, video processing operations corresponding to the modified video parameter until images captured by the camera under the modified video parameters are available at the first location.

19. The method of claim 18, comprising the step of controlling said video parameter in the processing circuit in accordance with said data added to said video representative signal formed by said camera.

\* \* \* \* \*